United States Patent
Blackwelder et al.

(10) Patent No.: US 8,294,316 B2
(45) Date of Patent: Oct. 23, 2012

(54) ELECTRICAL POWER GENERATION APPARATUS FOR CONTRA-ROTATING OPEN-ROTOR AIRCRAFT PROPULSION SYSTEM

(75) Inventors: Mark J. Blackwelder, Plainfield, IN (US); John Timothy Alt, Zionsville, IN (US); Steven Gagne, Avon, IN (US); Daniel Kent Vetters, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 310 days.

(21) Appl. No.: 12/572,342

(22) Filed: Oct. 2, 2009

(65) Prior Publication Data

US 2011/0024567 A1    Feb. 3, 2011

Related U.S. Application Data

(63) Continuation-in-part of application No. 12/510,334, filed on Jul. 28, 2009.

(51) Int. Cl.
    *H02K 23/60* (2006.01)
(52) U.S. Cl. .................. 310/115; 310/156.43; 310/212
(58) Field of Classification Search .............. 310/115, 310/156.43, 212–214, 54, 58; 244/134
    See application file for complete search history.

(56) References Cited

U.S. PATENT DOCUMENTS

| | | | |
|---|---|---|---|
| 2,429,061 A * | 10/1947 | Hunter ................. 244/134 D |
| 3,264,482 A | 8/1966 | Clark et al. | |
| 3,934,642 A | 1/1976 | Coulson et al. | |
| 4,060,212 A | 11/1977 | Magenheim | |
| 4,209,993 A | 7/1980 | Rannenberg | |
| 4,267,433 A | 5/1981 | Sahm, III | |
| RE32,100 E | 4/1986 | Rannenberg | |
| 4,782,658 A | 11/1988 | Perry | |
| 5,061,836 A | 10/1991 | Martin | |
| 5,131,812 A | 7/1992 | Boyd et al. | |
| 5,206,810 A | 4/1993 | Bools et al. | |
| 5,540,252 A | 7/1996 | Bruun | |
| 5,560,195 A | 10/1996 | Anderson et al. | |
| 5,704,567 A | 1/1998 | Maglieri | |
| 5,711,159 A | 1/1998 | Whipple, III | |
| 5,793,137 A * | 8/1998 | Smith ................. 310/114 |
| 6,069,341 A * | 5/2000 | Gage et al. ........... 219/201 |
| 6,134,874 A | 10/2000 | Stoten | |
| 6,525,641 B1 | 2/2003 | Frank | |
| 6,639,337 B1 | 10/2003 | Nakano | |
| 6,674,390 B1 * | 1/2004 | Murphy, Jr. ........... 342/13 |
| 6,725,645 B1 | 4/2004 | Wadia et al. | |
| 7,131,612 B2 | 11/2006 | Baptist et al. | |
| 7,163,369 B2 | 1/2007 | Bruce | |

(Continued)

FOREIGN PATENT DOCUMENTS

FR    2779584    12/1999

(Continued)

*Primary Examiner* — Quyen Leung
*Assistant Examiner* — Naishadh Desai
(74) *Attorney, Agent, or Firm* — McCormick, Paulding & Huber LLP

(57) ABSTRACT

An electrical power generation apparatus is embedded in a contra-rotating propulsion system that includes overlapping first and second shafts operatively connected for counter-rotation about a common axis. The electrical power generation apparatus includes a winding mounted to one of the shafts and a field array mounted to the other of the shafts adjacent to the winding. Relative rotation of the winding and the field array induces electrical current in the winding.

14 Claims, 7 Drawing Sheets

U.S. PATENT DOCUMENTS

| | | |
|---|---|---|
| 7,207,770 B2 | 4/2007 | Bruce |
| 7,217,091 B2 | 5/2007 | LeMieux |
| 7,220,098 B2 | 5/2007 | Bruce et al. |
| 7,228,616 B2 | 6/2007 | Stephens |
| 7,305,845 B2 | 12/2007 | Mangano et al. |
| 7,398,641 B2 | 7/2008 | Stretton et al. |
| 7,429,166 B2 | 9/2008 | Mitchell |
| 2004/0066107 A1 | 4/2004 | Gery |
| 2005/0073206 A1* | 4/2005 | Wilsdorf ............... 310/178 |
| 2005/0200830 A1* | 9/2005 | Carter et al. ............ 355/75 |
| 2005/0236918 A1 | 10/2005 | Van Den Bergh et al. |
| 2006/0163963 A1* | 7/2006 | Flores ................. 310/115 |
| 2008/0042515 A1* | 2/2008 | Butterfield ............ 310/268 |
| 2008/0226450 A1* | 9/2008 | Clarke et al. ........... 416/124 |
| 2009/0007417 A1* | 1/2009 | Yamashita et al. ....... 29/608 |
| 2009/0134626 A1 | 5/2009 | Hoppe et al. |
| 2009/0289516 A1* | 11/2009 | Hopewell et al. ........ 310/115 |
| 2010/0079016 A1* | 4/2010 | Hemmelmann et al. .... 310/54 |

FOREIGN PATENT DOCUMENTS

| | | |
|---|---|---|
| GB | 1147730 | 4/1969 |
| GB | 1174969 | 12/1969 |

* cited by examiner

ELECTRICAL POWER GENERATION APPARATUS FOR CONTRA-ROTATING OPEN-ROTOR AIRCRAFT PROPULSION SYSTEM

CROSS REFERENCE TO RELATED APPLICATIONS

This application is a continuation-in-part of, and claims priority to, U.S. patent application Ser. No. 12/510,334, filed on Jul. 28, 2009, hereby incorporated herein by reference in its entirety.

FIELD OF THE INVENTION

The present invention relates generally to apparatus for de-icing rotors of aircraft propulsion systems, and more particularly to an electrical power generation apparatus for providing electrical power to de-icing apparatus mounted on rotors of a contra-rotating open rotor aircraft propulsion system.

BACKGROUND OF THE INVENTION

Icing of aerodynamic surfaces is a well-known problem in the art of aeronautics. Icing can be partly mitigated by on-ground application of chemical compounds to prevent formation or adhesion of ice particles on the aerodynamic surfaces. However, with particular reference to open rotor aircraft propulsion systems, on-ground treatments have not proven generally effective for the duration of flight. Accordingly, various in-flight de-icing systems and methods have been used. For example, ice can be removed by microwave power impinging upon adsorbing structures on rotor blades to separate ice from the blade, as disclosed for example by U.S. Pat. Nos. 4,060,212 and 5,061,826. Equally, electrical heating elements can be mounted on rotor blades to separate ice from the blades, as disclosed for example by U.S. Pat. No. 5,131,812.

Known in-flight de-icing methods for propulsion rotors require transfer of power from the main airframe to the propulsion rotors. There are several difficulties with the various known methods for transferring power from the main airframe to the rotors of a contra-rotating open rotor aircraft propulsion system. Mechanical power transfer requires rotating contact between components that wear, bind, slip, and/or add undesirable weight and/or friction to the propulsion rotor assembly. Optical beam power transfer is susceptible to interference from opaque materials, and typically requires a fixed line-of-sight not easily achieved in a contra-rotating propulsion rotor system. Fluid power transfer along a contra-rotating propulsion rotor system requires provision of complex seals and fluid passages that are susceptible to wear and leakage. Radiative power transfer is difficult to focus, therefore prone to leakage that increases thermal management requirements of the propulsion system. Electrical power transfer, using slip ring assemblies, is a very common method that has proven failure modes associated with arcing caused by hydraulic fluid mixing with carbon dust formed by the slip ring brushes. Additionally, due primarily to brush wear, slip ring assemblies are high maintenance items requiring servicing on the order of hundreds of hours of operation. Within contra-rotating propulsion systems, the maintenance requirements associated with slip rings become both more frequent (because the contra-rotating elements rotate at higher relative speed, causing greater rates of brush wear) and more problematic (because at least one slip ring is "buried" within the contra-rotating shaft assembly). Moreover, in a typical contra-rotating propulsion system, one of the propulsion rotors is arranged distally from the main airframe. In such a typical contra-rotating propulsion system, electrical power can be provided from the main airframe to the distal propulsion rotor only through a sequence of two slip rings. Sequential arrangement of slip rings reduces the efficiency of power transfer, and also significantly worsens the chance of a failure in the overall electrical power transfer system.

With the foregoing problems and concerns in mind, it is the general object of the present invention to provide a system of power transfer, within a contra-rotating open rotor aircraft propulsion system, which overcomes the above-mentioned drawbacks.

SUMMARY OF THE INVENTION

Accordingly, in one embodiment of the present invention, an electrical power generation apparatus includes first and second shafts. A winding is mounted to the first shaft. An electrical load mounted to the first shaft is electrically connected to receive electrical current from the winding. A field array is mounted to the second shaft adjacent to the winding. The first shaft and the second shaft are operatively connected for relative rotation of the first shaft and the second shaft. Relative rotation of the first and second shafts induces an electrical current in the winding to power the electrical load.

In another embodiment of the present invention, an electrical power generation apparatus is embedded in a contra-rotating propulsion system that includes overlapping first and second shafts operatively connected for counter-rotation about a common axis. The electrical power generation apparatus includes a winding mounted to one of the shafts and a field array mounted to the other of the shafts adjacent to the winding. Relative rotation of the winding and the field array induces electrical current in the winding.

In another embodiment of the present invention, a contra-rotating open rotor aircraft propulsion system includes first and second overlapping shafts operatively connected for counter-rotation about a common axis. Each shaft includes a rotor blade set. The propulsion system further includes a de-icing apparatus, which at least includes a first de-icing element mounted to one of rotor blade sets, a winding mounted on the shaft corresponding to the rotor blade set having the de-icing element, and a field array mounted on the other shaft adjacent to the winding. Relative rotation of the winding and the field array induces an electrical current in the winding to power the de-icing element, thereby de-icing the rotor blade set having the de-icing element.

The present invention thereby provides electrical power to rotating parts of a contra-rotating mechanical system without requiring an electrical connection or a mechanical connection between the rotating parts for purposes of power transfer.

DETAILED DESCRIPTION OF THE PREFERRED EMBODIMENT

Figure 1:
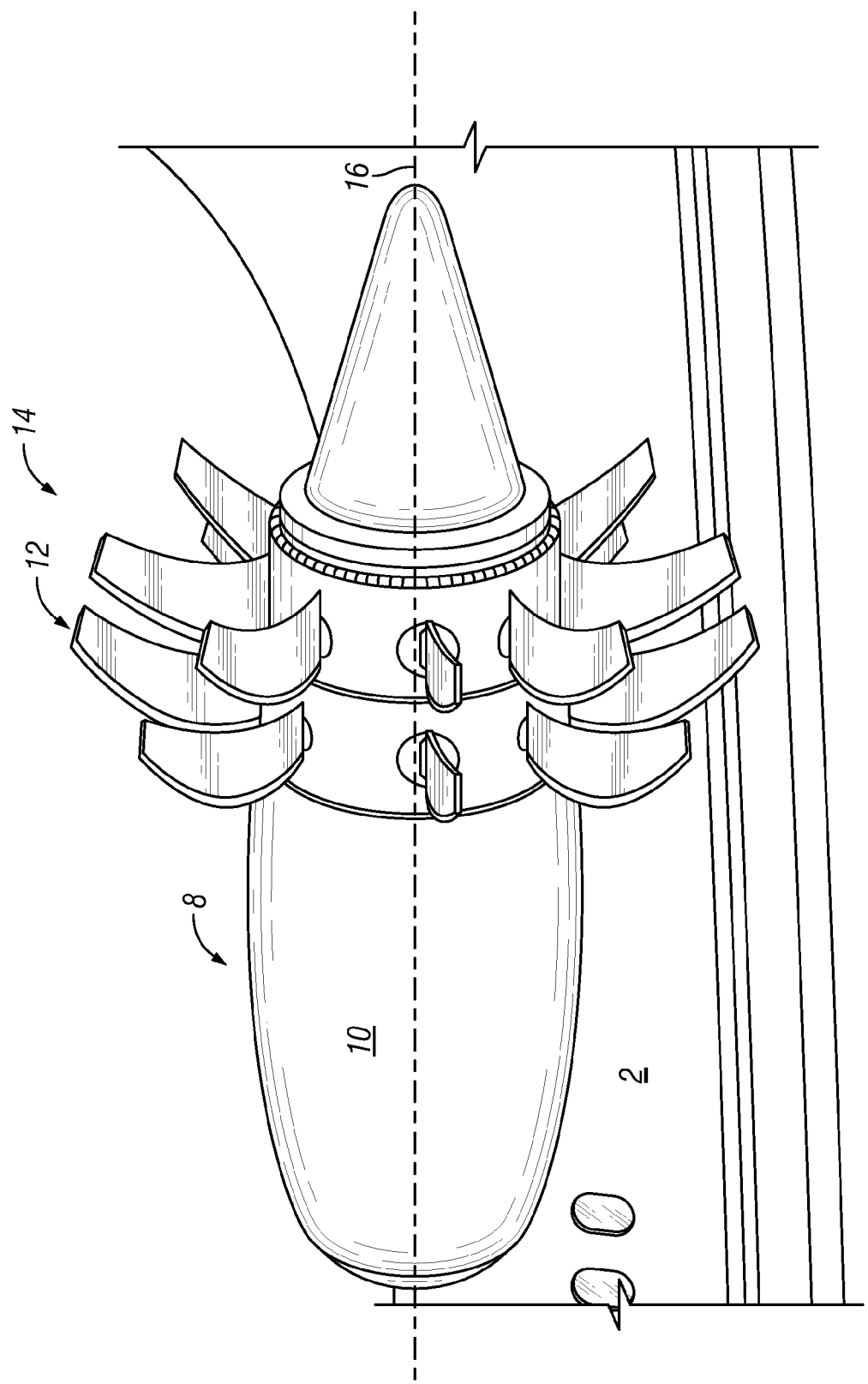
FIG. 1 is a perspective view of a portion of an aircraft having a contra-rotating open rotor propulsion system.

Referring to FIG. 1, a jet aircraft 2 can be propelled by a contra-rotating open rotor propulsion system 8, which is controlled by an avionics package (not shown). The contra-rotating open rotor propulsion system 8 includes a jet engine 10 or similar prime mover, which drives a forward open rotor blade set 12 and an aft open rotor blade set 14 disposed aft of the jet engine in a "pusher configuration". Alternatively, the forward and aft rotor blade sets can be disposed forward of the jet engine in a "tractor configuration". Throughout the following detailed description of the drawings, the forward rotor blade set should be regarded as exemplary of a rotor blade set disposed proximate to the jet engine, and the aft rotor blade set should be regarded as exemplary of a rotor blade set disposed distal from the jet engine. The forward and aft rotor blade sets contra-rotate about a common axis 16 defined by the jet engine. For example, the forward shaft can be driven by the jet engine to rotate in a clockwise (CW) direction and the aft shaft can be driven by the jet engine to rotate in a counterclockwise (CCW) direction.

Figure 2:
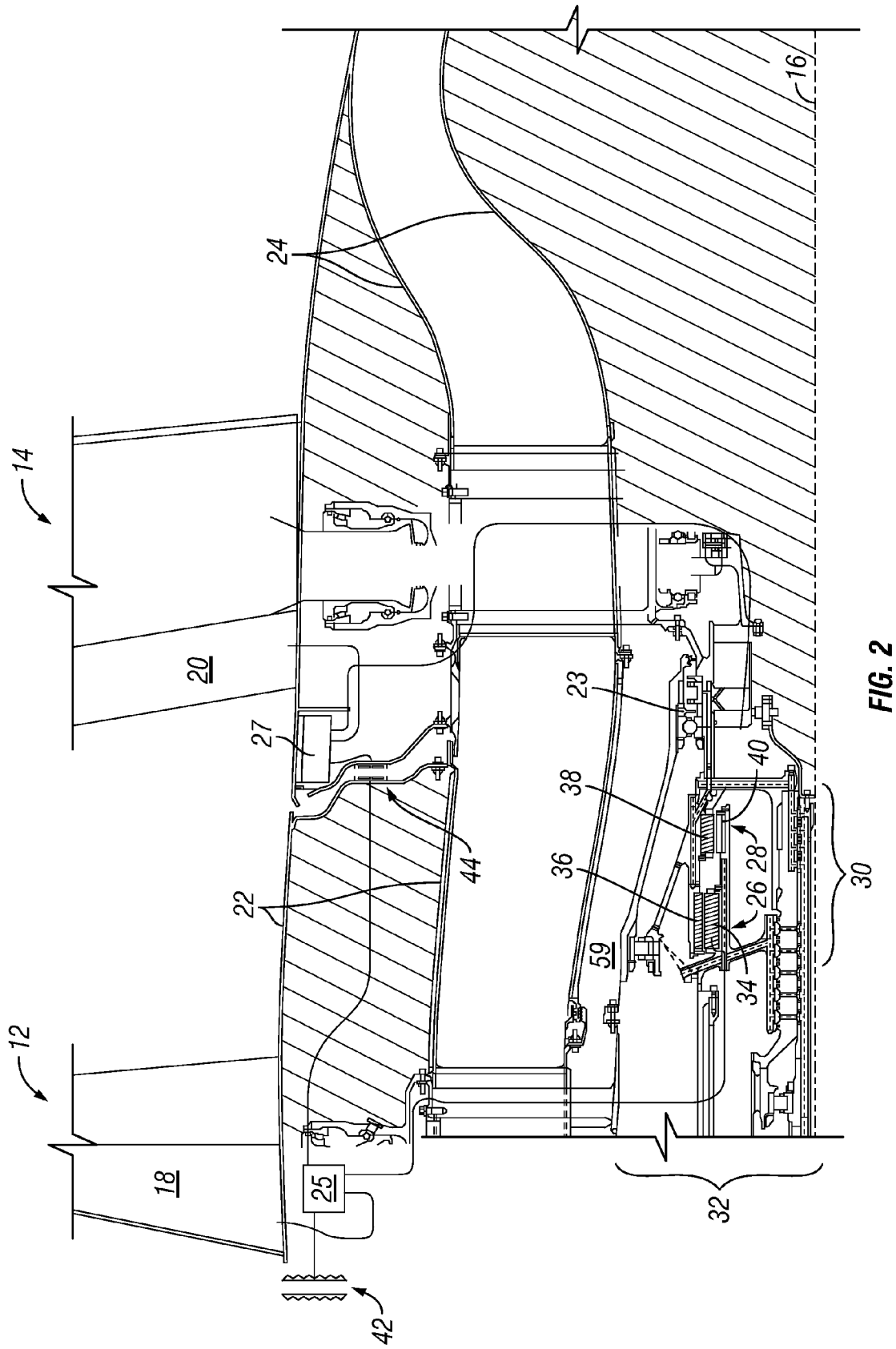
FIG. 2 is a detailed side sectional view of rotor de-icing apparatus powered by counter-rotating permanent magnet generators, according to a first embodiment of the present invention, as installed in the contra-rotating open rotor aircraft propulsion system shown in FIG. 1.

Referring to FIG. 2, forward and aft de-icing apparatus 18, 20 are mounted near leading edges of the forward rotor blade set 12 and of the aft rotor blade set 14, respectively, for melting ice that forms on the rotor blade sets during flight. For example, the forward and aft de-icing apparatus may be electrical resistance heating elements. The forward blade set is mounted on a forward shaft 22 extending aft from the jet engine. The aft open rotor blade set is mounted on an aft shaft 24 extending aft from the forward rotor blade set. The aft shaft is radially nested within the forward shaft to be driven by a common gear set (not shown) disposed within the jet engine. The aft shaft is rotatably supported within the forward shaft by bearings 23.

The forward and aft de-icing apparatus are electrically connected to receive conditioned electrical current from forward and aft power control and conditioning units 25, 27, respectively. The forward power control and conditioning unit is connected to receive electrical current from a forward permanent magnet (PM) generator 26. The aft power control and conditioning unit 27 is connected to receive electrical current from an aft permanent magnet (PM) generator 28. Each power control and conditioning unit is configured to selectively interrupt, modulate, clip, or otherwise modify the electrical current passing from the associated generator to the associated de-icing apparatus.

The forward and aft PM generators are mounted next to each other on the forward and aft shafts 22, 24, within an axial overlap region 30 defined by the nested axial ends of the forward and aft shafts adjacent to the bearings 23. Preferably, the forward and aft PM generators are mounted within an oil-mist-cooled volume 32 contained by the forward and aft shafts, so that oil spray jets (not shown) can cool the PM generators. The disposition of the PM generators at an axial distance from the bearings mitigates heat transfer between the bearings and the PM generators. The radial gap arrangement of the PM generators provides for ease of assembly, but imposes tighter dimensional tolerances on the shaft assembly than would be required if the PM generators were disposed adjacent to the bearings.

The forward permanent magnet generator includes a forward winding 34 mounted on the forward shaft and a forward permanent magnet array 36 mounted on the aft shaft, radially opposing the forward winding. The aft permanent magnet generator includes an aft winding 38 and an aft permanent magnet array 40 mounted at radially opposing locations on the aft and the forward shafts, respectively. Thus, as shown in FIG. 2, each PM generator has a winding radially opposing a complementary cylindrical array of permanent magnets. The radial-gap configuration of the forward and aft PM generators provides for ease of assembly. Each permanent magnet array acts as a field array providing a magnetic field that rotates with reference to the corresponding winding for inducing an electrical current in the corresponding winding. Typically, each permanent magnet array includes magnetically soft material, or "back iron", for flux guidance and shielding of the array. The permanent magnets may be manufactured of any sufficiently coercive permanent magnet material such as Alnico, Neodymium Iron Boron, or Samarium Cobalt.

The winding of the forward PM generator is electrically connected to provide electrical current to the forward de-icing apparatus through the forward power control and conditioning unit 25. The winding of the aft PM generator is electrically connected to provide electrical current to the aft de-icing apparatus through the aft power control and conditioning unit 27. The forward power control and conditioning unit is electrically connected to receive control signals from the avionics package (not shown) via a forward rotary signal transfer transformer 42, and also is electrically connected to send control signals to the aft power control and conditioning unit via an aft rotary signal transfer transformer 44. Thus both of the forward and aft de-icing apparatus can be controlled in tandem by the avionics package.

Figure 3:
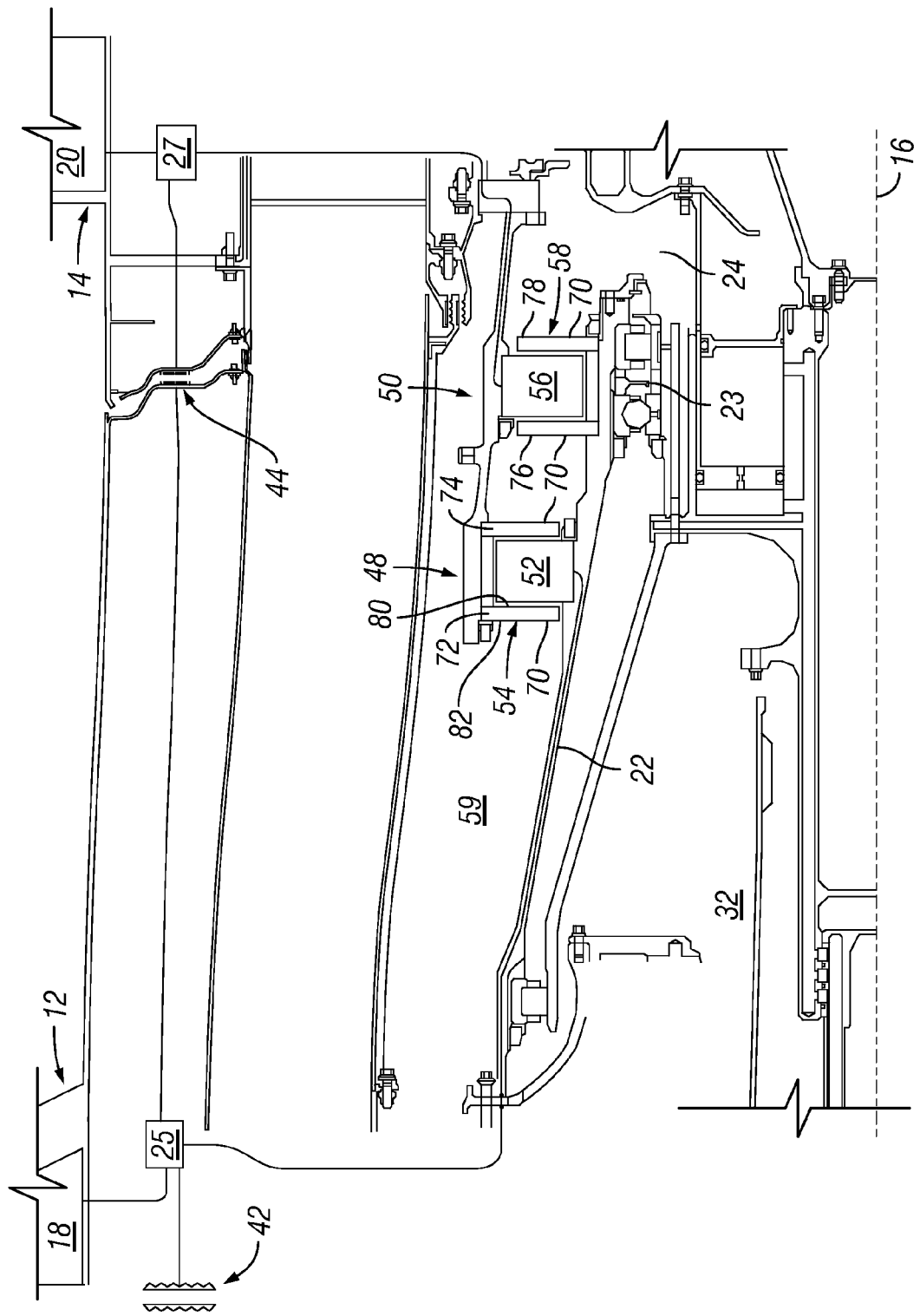
FIG. 3 is a side sectional view of a portion of a rotor de-icing apparatus powered by counter-rotating Halbach-array generators, according to a second embodiment of the present invention, as installed in the contra-rotating open rotor aircraft propulsion system shown in FIG. 1.

Referring to FIG. 3, the forward and aft de-icing apparatus 18, 20 can alternatively be configured to receive electrical current from forward and aft Halbach-array generators 48, 50. The forward Halbach-array generator includes an inner winding 52 and a forward flat circular Halbach array pair 54. The inner winding of the forward Halbach-array generator is mounted to protrude radially outward from the forward shaft 22. The forward flat circular Halbach array pair is mounted to protrude radially inward from the aft shaft 24, forward and aft of the inner winding. The aft Halbach-array generator includes an outer winding 56 and an aft flat circular Halbach array pair 58. The outer winding of the aft Halbach-array generator is mounted to protrude radially inward from the aft shaft 24. The aft flat circular Halbach array pair 58 is mounted to protrude radially outward from the forward shaft, forward and aft of the outer winding.

The windings of the forward and aft Halbach-array generators are electrically connected to provide electrical current to the forward and aft power control and conditioning units 25 and 27, respectively. The forward and aft Halbach-array generators are mounted within an oil-free volume 59 provided between the forward and aft shafts 22, 24 and are air-cooled. The axial gap configuration of the Halbach-array generators and the disposition of the Halbach-array generators axially proximate to the bearings 23 mitigate dimensional tolerance requirements for the shaft assembly as a whole.

Figure 4:
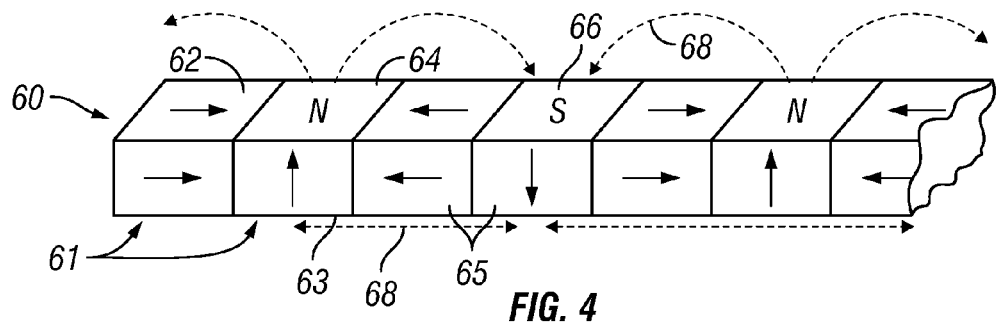
FIG. 4 is a schematic view of a linear Halbach array and of the magnetic field produced thereby.

Referring to FIG. 4, a typical linear Halbach array 60 includes a plurality of permanent magnets 61 arranged to form repeating patterns of pole faces along a working surface 62 and along a shielding surface 63 opposed to the working surface. In FIG. 4, each "N" indicates a "north" pole face 64 having magnetic flux directed substantially perpendicularly outward from the N pole face; each arrow indicates a side face 65 having magnetic flux directed substantially along the side face in the direction of the arrow; and each "S" indicates a "south" pole face 66 having magnetic flux directed substantially perpendicularly into the south pole face. As arranged in the typical linear Halbach array, the N pole faces, side faces, and S pole faces reinforce a magnetic field 68 adjacent to the working surface and cancel or severely constrain the magnetic field adjacent to the shielding surface. The reinforced magnetic field repeats in a cyclic fashion along the working surface of the typical linear Halbach array.

Referring back to FIG. 3, the forward flat circular Halbach array pair 54 includes a plurality of wedge-shaped permanent magnet sections 70 arranged in two axially-opposing flat circular Halbach arrays 72, 74, which are disposed forward and aft, respectively, of the forward winding 52. The aft flat circular Halbach array pair similarly includes two axially-opposing flat circular Halbach arrays 76, 78. Each of the flat circular Halbach arrays 72, 74 has a working surface 80 that faces the opposite Halbach array, and has a shielding surface 82 that faces away from the opposite Halbach array.

Figure 5:
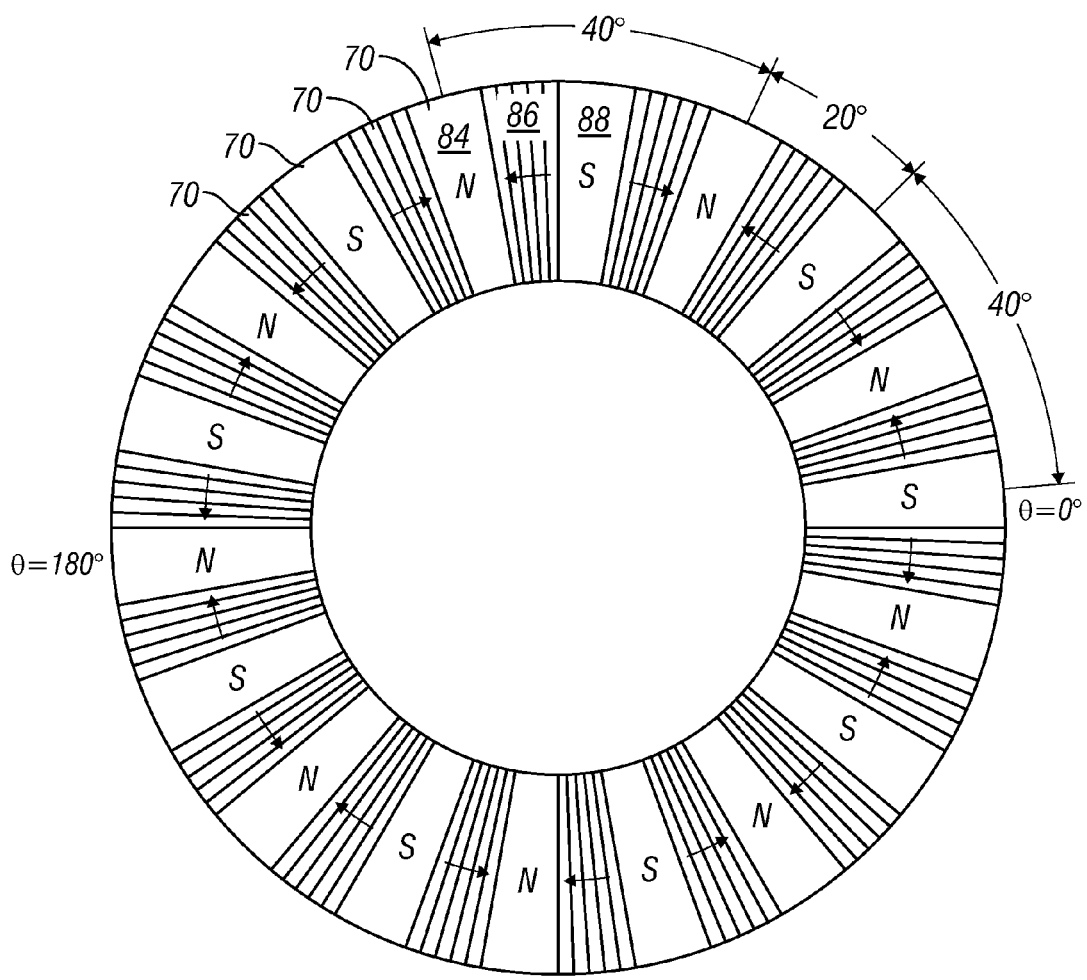
FIG. 5 is a schematic view of flat circular Halbach arrays used in one of the Halbach-array generators shown in FIG. 3.

Referring to FIG. 5, each of the flat circular Halbach arrays includes N pole permanent magnet sections 84, transitional permanent magnet sections 86, and S pole permanent magnet sections 88. Each of the flat circular Halbach arrays has eighteen (18) poles—nine (9) N pole pieces and nine (9) S pole pieces—circumferentially distributed at twenty degree) (20°)intervals, with five transition pieces between each N pole piece and the following S pole piece, for a total of two hundred and sixteen (216) permanent magnet sections in each Halbach array pair 54, 58.

Each Halbach array 54, 58 is about 9 millimeters (mm) thick axially and has a 47 centimeter (cm) outer diameter and a 40 cm inner diameter for a radial width of about 75 mm. Each Halbach array generator 48, 50 has an axial thickness of about 82 mm with 2 mm axial air gaps between each winding and the adjacent working surfaces of the associated Halbach array pair. Each pole piece 84, 88 covers approximately 4.18° along the Halbach array pair circumference, while the transition pieces 86 occupy 15.82° between each adjacent pair of N and S pole pieces. The permanent magnet sections 70 can be built with alnico, neodymium iron boron, or samarium cobalt to have permanent magnet density of about 7.4 g/cm³ and magnet coercive force of about 980 kA/m.

Figure 6:
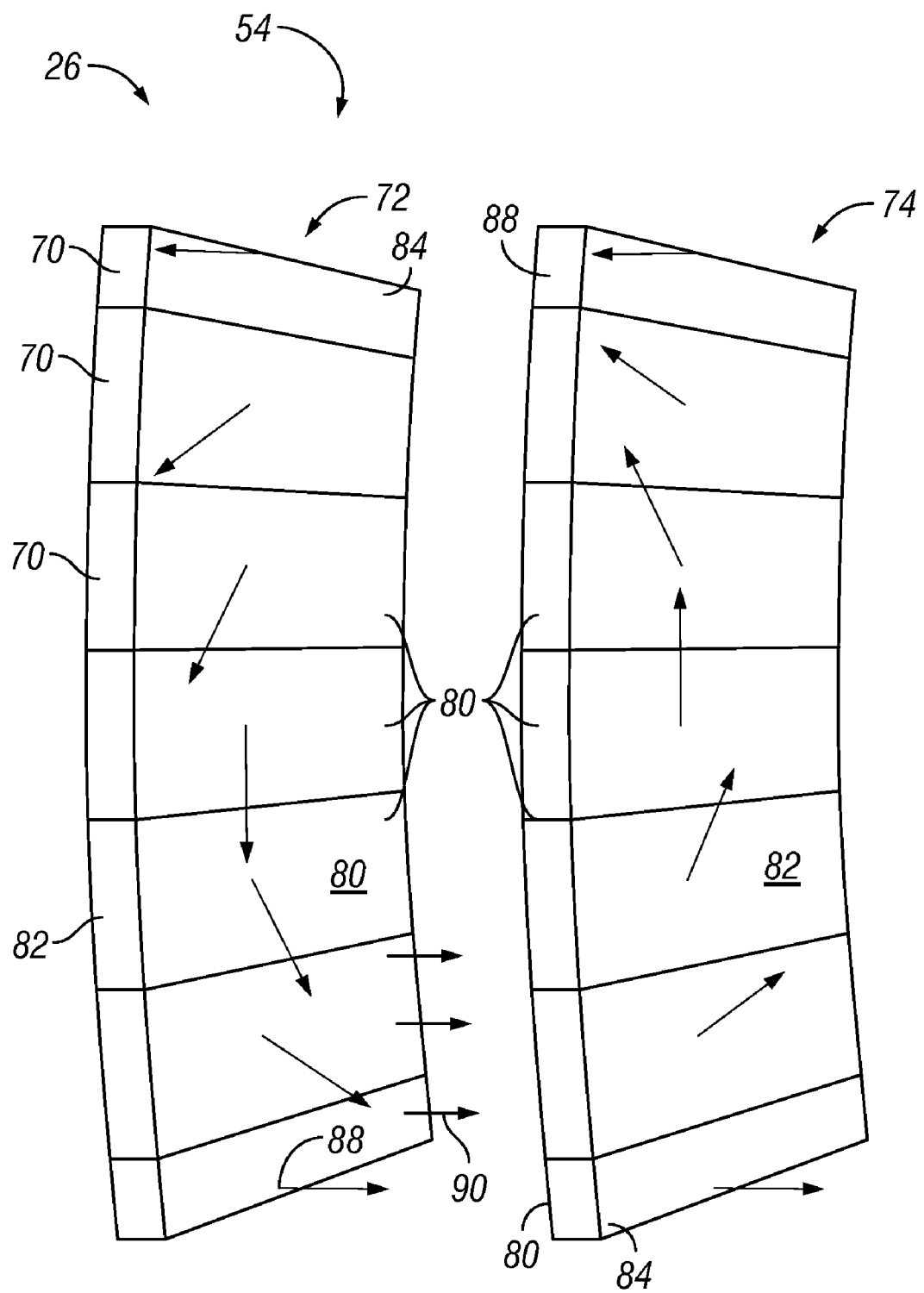
FIG. 6 is a perspective schematic view of magnetic field lines produced by a portion of a flat circular Halbach array pair in one of the Halbach-array generators shown in FIG. 3.
Figure 7:
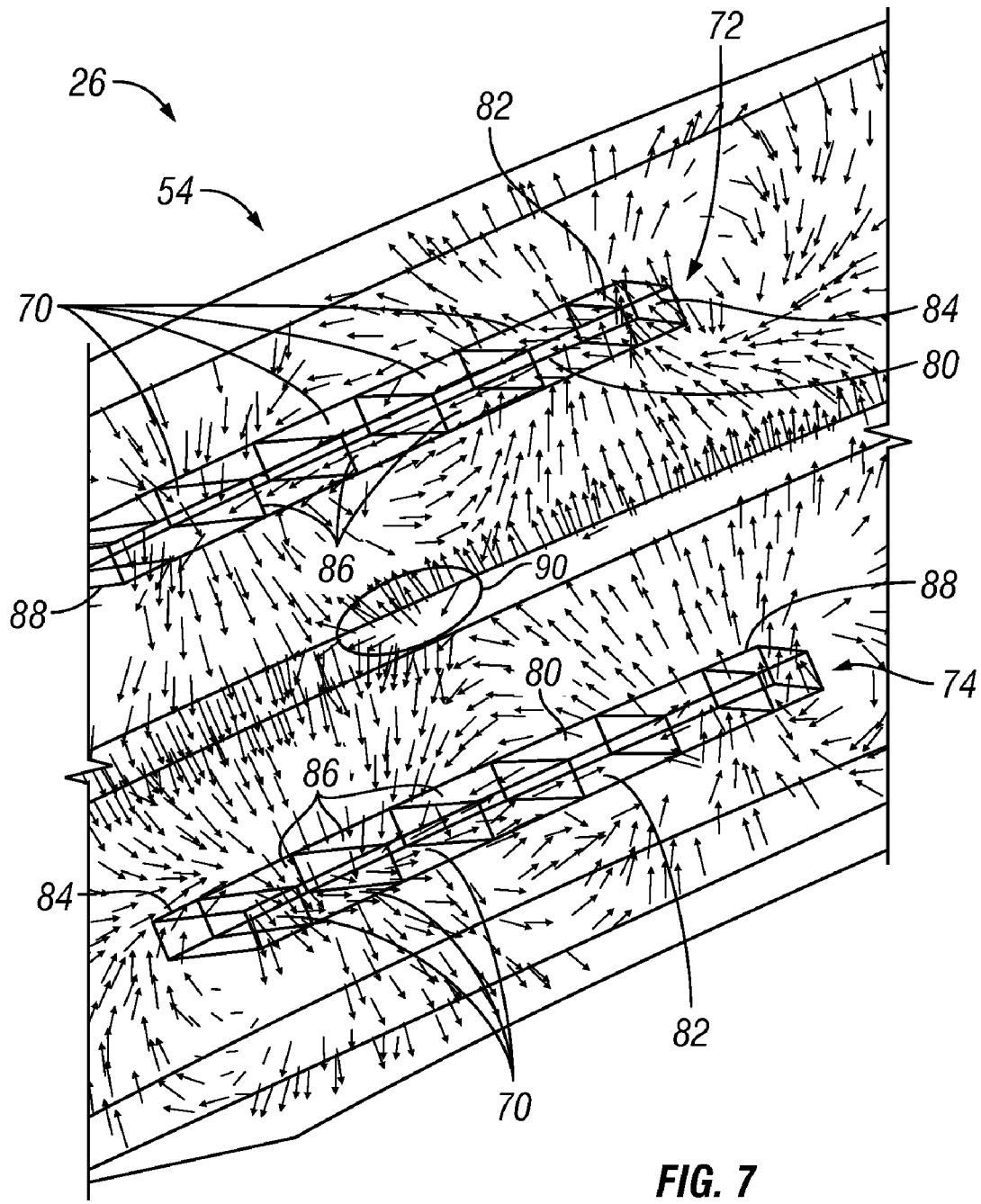
FIG. 7 is a second perspective schematic view of magnetic field lines produced by the flat circular Halbach array pair shown in FIG. 6.

As shown in FIGS. 6 and 7, the forward flat circular Halbach array pair 54 is arranged with a circumferential offset so that N pole pieces 84 in the forward and aft Halbach arrays 72 and 74 are opposed to S pole pieces 88 in the aft and forward Halbach arrays 74 and 72, respectively, thereby forming a circumferential pattern of alternating magnetic dipoles between the working surfaces 80 of the forward flat circular Halbach array pair. The aft flat circular Halbach array pair 58 is similarly arranged. The circumferential pattern of alternating magnetic dipoles provides a substantially axially-directed magnetic field 90 that varies circumferentially between the working surfaces 80, while containing substantially all magnetic flux between the axially outward shielding surfaces 82. Each Halbach array pair 54, 58 thereby provides electromagnetic self-shielding for the associated Halbach-array generator 48, 50. Because the Halbach array pairs provide self-shielding, the Halbach-array generators can be built substantially without "back iron" typically used for magnetic field containment.

Figure 8:
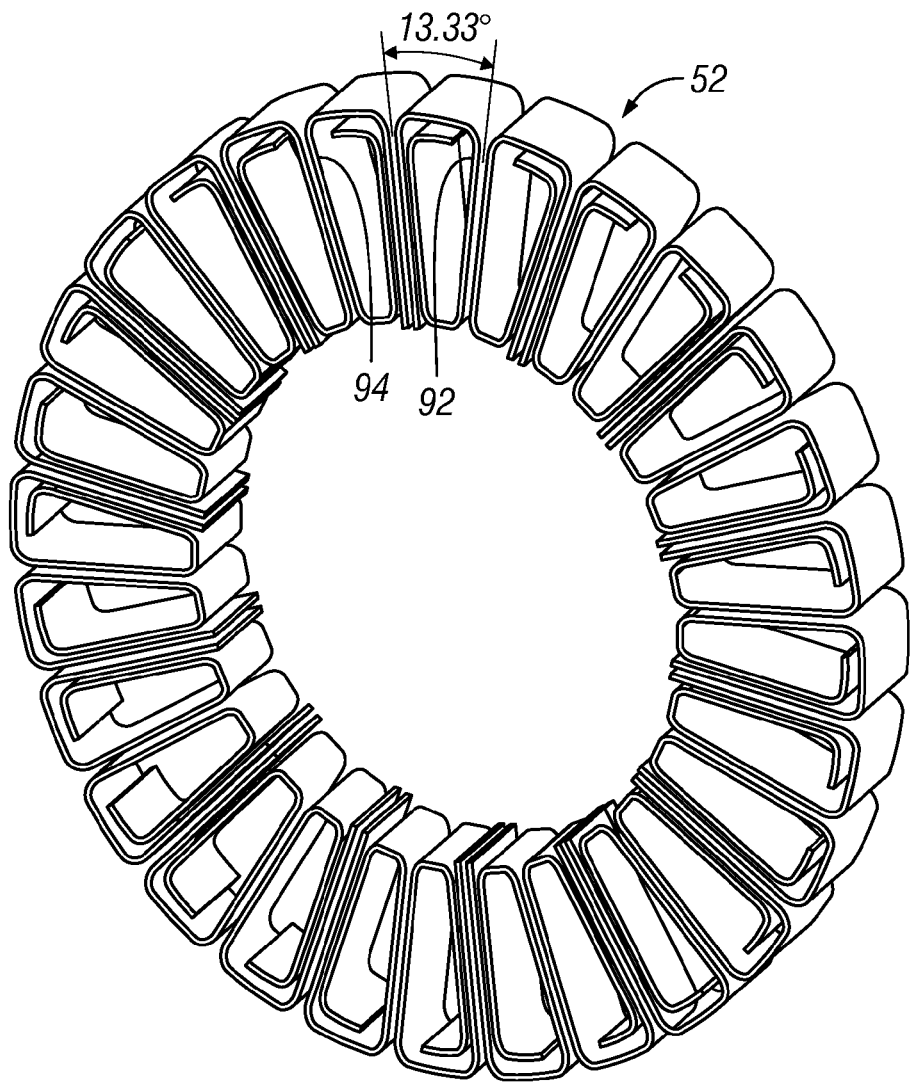
FIG. 8 is a schematic view of a winding in one of the Halbach-array generators shown in FIG. 3.

Referring to FIG. 8, the inner winding 52 of the forward Halbach array generator 48 includes a plurality of conductive coils 92, 94 arranged in a circumferential array matching the flat circular patterns of N and S pole pieces in the associated Halbach array pair. The outer winding 56 of the aft Halbach array generator 50 includes a similar circumferential array of coils. Each winding has twenty seven (27) 13.33° intervals. The coils of the windings are built with 19 turns per coil and a ⅔ coil-to-pole coverage ratio (each coil occupying approximately 6.67° of the winding circumference). The winding configuration shown in FIG. 8 can also be utilized in the permanent magnet generators 26, 28.

Figure 9:
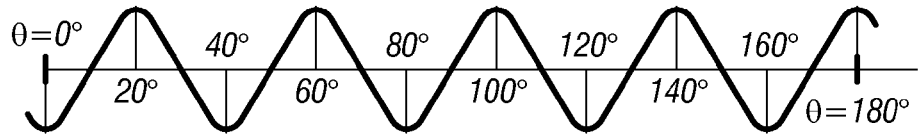
FIG. 9 is a wavelet graph of the magnetic flux coupled by a single coil in the winding of FIG. 8 as the coil revolves about the axis of the Halbach-array generator shown in FIG. 3.

Referring to FIG. 9, between the inward working surfaces 76 of each Halbach array pair, the magnitude of the reinforced axial magnetic field 90 is substantially sinusoidal with respect to a circumferential angle θ around the generator central axis 30. Thus the magnetic flux φ that is coupled by a single conductive coil 92 or 94 within one of the windings, can be calculated according to $$\phi = \int \mu_0 \cdot H(\theta) \cdot l \cdot r \cdot d\theta \quad \text{(Equation 1)},$$

as shown in FIG. 9 for a coil 92 within the inner winding 52 of the forward Halbach array generator 48.

For a single conductive coil 92 or 94 that covers two thirds of the corresponding pole piece 84 or 88, taking the minimum field intensity at zero radians mechanical, and assuming phase A is aligned with zero radians mechanical, the back electromotive force for phase A can be calculated according to $$E_a = \frac{1}{\sqrt{2}} \cdot \omega_m \cdot N_{coil} \cdot N_s \cdot r \cdot l \cdot \mu_0 \cdot \frac{(l\_m + 2 \cdot w\_mag)}{l\_ap} \cdot H_c \cdot \frac{2}{P} \cdot \sin\left(\frac{\pi}{3}\right) \cdot \cos(\theta_r) \quad \text{(Equation 2)}$$

in volts RMS, where $w_m$ is the mechanical rotational velocity in radians per second, $N_{coil}$ is the number of coils per phase, $N_s$ is the number of turns per coil, r is the average radius in meters, l is the height of the magnet section in meters, $m_0$ is the permeability of free space and the permanent magnet in henries per meter, l_m is the thickness of the magnet in meters, w_mag is the width of the magnet section in meters, l_ap is the average length of the flux air path including the permanent magnet path in meters, $H_c$ is the coercive force of the permanent magnet in amps per meter, and $q_r$ is the angle between the rotor quadrature axis and phase A of the stator. The back EMF for phase A is at a maximum when $q_r$ is zero radians.

The inductance per phase can be calculated in henries according to $$L_m = N_{coil} \cdot \frac{N_s^2 \cdot \mu_0 \cdot l \cdot l\_m}{l\_ap}. \quad \text{(Equation 3)}$$

In operation, referring particularly to FIGS. 1 and 2, the contra-rotating open rotor aircraft propulsion system 10 is driven at a machine mechanical speed of twenty cycles per second (20 Hz or 1200 RPM) so that the forward and aft shafts 22, 24 rotate at a relative speed of 2400 RPM causing each of the twenty seven (27) coils 92, 94 to cross three hundred and sixty (260) dipoles per second. At operational speed, presuming approximately zero (0) ohms armature resistance, approximately zero Tesla (0 T) leakage flux, 5 A/mm$^2$ current density in the windings, and 1.5429 ohms load resistance per phase, and modeling the Halbach array permanent magnet sections 70 as infinitely thin surface conductors, the eighteen (18) poles of each Halbach array pair induce 28 kilowatts of three phase alternating current in each winding at two hundred eight (208) volts RMS and three hundred sixty cycles per second (360 Hz), for a power factor of 0.998. The volume of active material, including the windings and the Halbach array pairs 54, 58, is 8.71 liters, and the mass of the active material is 78 kilograms, for a total electrical power/weight ratio of 56 kW/78 kg.

One advantage of the present invention is that, by using the contra-rotation of the shafts to generate electrical power in the same rotational frames as the open rotor blades, the electrical power generation apparatus permits provision of electrical power to the open rotors without requiring mechanical, optical, fluid, radiative, or electrical connections, contact, or communication between the contra-rotating portions of the propulsion system for purposes of power transfer. More specifically, according to one embodiment of the present invention, contra-rotating permanent magnet generator windings arranged on a forward shaft and an aft shaft within the contra-rotating propulsion system are respectively electrically connected, via power control and conditioning units, to de-icing heater elements disposed at leading edges of the contra-rotating forward rotor blades and aft rotor blades.

Another advantage of the present invention is that the electrical power generating apparatus disclosed herein permits provision of electrical power to a distal propulsion rotor in a contra-rotating propulsion system, without using slip rings. As will be appreciated in view of the present disclosure, eliminating the use of slip rings generally reduces maintenance requirements. Specifically within a contra-rotating propulsion system, eliminating the use of slip rings provides substantial advantages for efficiency, reliability, and ease of maintenance. In particular, because the generators of the present invention do not require brush maintenance, the generators can be conveniently embedded within the propulsion system without limiting the propulsion system design for the sake of frequent maintenance access.

Additionally, the present invention provides a capability of embedded electromechanical power conversion within a contra-rotating open rotor aircraft propulsion system, without induction of eddy currents in adjacent rotating frames. More specifically, according to another embodiment of the present invention, paired Halbach arrays of permanent magnets are embedded into contra-rotating shafts of an aircraft propulsion system to provide axial flux path electromagnetic machines (Halbach-array generators) that deliver electrical current to rotor blade de-icing apparatus. Each Halbach-array generator includes a rotating winding that is mounted to the same rotating structure as are the rotor blades requiring de-icing power, and also includes a self-shielded magnetic field source that does not rotate with the rotating coil structure. By providing a self-shielding magnetic field source, the Halbach arrays substantially eliminate any need for magnetic flux guidance or containment using "back iron" or ferromagnetic steel shield rings.

Although the Halbach arrays typically require a slightly greater volume and weight of permanent magnet than would be needed for more conventional permanent magnet motor arrangements, the elimination of "back iron" and associated weight reduction more than compensates for the added weight of the Halbach arrays themselves. Additionally, the Halbach arrangement reduces or eliminates torque ripple and electrical harmonics. The magnetic coupling in an axial flux path of the dual magnet groups to the coils eliminates wear and is efficient.

Another advantage of the present invention is that the mutually aligned Halbach arrays form magnetic dipoles so that, between axially facing surfaces of the Halbach arrays, the axial magnetic flux intensity varies as the sinusoid of the circumferential angle around the central axis of the permanent magnet section. Outside the axially outward surfaces of the Halbach arrays, the magnetic flux is essentially zero magnitude to provide a self-shielding characteristic. Current induced in the rotating winding by relative angular motion of the self-shielded Halbach array pair powers the rotor blade de-icing apparatus.

Another advantage of the present invention is that contra-rotation of the field arrays and the generator windings provides for doubled relative rotational speed within the mechanical limits of the arrays and windings, thereby producing greater electrical currents than could be achieved with known generator arrangements of similar size and weight.

As will be recognized by those of ordinary skill in the pertinent art, numerous modifications and substitutions can be made to the above-described embodiments of the present invention without departing from the scope of the invention. For example, although the forward and aft contra-rotating generators are described as having permanent magnet field arrays, with provision of a third generator arranged between the forward shaft and the airframe, field windings could be used in place of field arrays in all three generators. Also, although the forward and aft Halbach-array generators 48, 50 are shown as having axial gaps to accommodate the inner and outer windings, the Halbach-array generators also can be implemented in a radial gap configuration. Similarly, although the permanent magnet generators 26, 28 are shown having radial gaps, the permanent magnet generators also can be implemented with axial gaps. The embodiments of the apparatus may be in any form where magnetic field is modulated within a conducting coil. For example, permanent magnet brushless DC motors with field wound rotors also can be utilized in an embodiment of the present invention While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An electrical power generation apparatus comprising:
   a first shaft;
   a first winding mounted to said first shaft and including a plurality of coils arranged for revolution about said common axis;
   a first electrical load mounted to said first shaft and electrically connected to receive electrical current from said first winding;
   a second shaft; and
   a first field array mounted on said second shaft, adjacent to said first winding, said first field array including first and second flat circular Halbach arrays with mutually-opposing working surfaces facing said first winding, N poles on the working surface of the first flat circular Halbach array being aligned with S poles on the working surface of the second flat circular Halbach array to form shielded magnetic dipoles between the working surfaces of said field array,
wherein said first shaft and said second shaft are operatively connected for contra-rotation of said second shaft relative to said first shaft, so that rotation of said first field array relative to said first winding induces an electrical current in said first winding to power said first electrical load.

2. The apparatus of claim 1, wherein said first field array is a permanent magnet field array.

3. The apparatus of claim 1, wherein said first field array includes magnetically soft material for flux guidance.

4. The apparatus of claim 1, further comprising: a second winding mounted to said second shaft and extending toward said first shaft; a second field array mounted to said first shaft and extending toward said second winding; and a second electrical load mounted to said second shaft and electrically connected to receive electrical current from said second winding.

5. The apparatus of claim 1, wherein said first winding and said first field array are disposed in a liquid-cooled volume adjacent to said first and second shafts.

6. An electrical power generation apparatus embedded in a contra-rotating propulsion system including overlapping first and second shafts operatively connected for counter-rotation about a common axis, the apparatus comprising:
a first winding mounted to one of said first and second shafts;
a first electrical load mounted to the one of said first and second shafts and electrically connected to receive electrical current from said first winding; and
a first field array mounted on the other of said first and second shafts adjacent to said first winding, wherein relative rotation of said first winding and said first field array induces electrical current in said first winding to power said first electrical load,
wherein said first field array includes first and second circular Halbach arrays with mutually-opposing working surfaces facing said winding, N poles on the working surface of the first circular Halbach array being aligned with S poles on the working surface of the second circular Halbach array to form shielded magnetic dipoles between the working surfaces of said field array.

7. The apparatus of claim 6, wherein said first field array includes magnetically soft material for flux guidance.

8. The apparatus of claim 6, wherein said first field array is a permanent magnet field array.

9. The apparatus of claim 6, wherein said first and second shafts overlap radially, said first winding extends from the one of said first and second shafts toward the other of said first and second shafts, and said first field array includes first and second flat circular Halbach arrays that extend from the other of said first and second shafts toward the one of said first and second shafts so as to bracket said winding.

10. The apparatus of claim 6, wherein said first winding and said first field array are air-cooled.

11. A contra-rotating open rotor aircraft propulsion system including first and second overlapping shafts operatively connected for counter-rotation about a common axis, said first and second shafts including respective first and second rotor blade sets protruding therefrom, the propulsion system further including a de-icing apparatus, the de-icing apparatus comprising:
a first de-icing element mounted to one of said first rotor blade set and said second rotor blade set;
a first winding mounted on the one of said first shaft and said second shaft including the one of said first rotor blade set and said second rotor blade set, and electrically connected to provide an electrical current to said first de-icing element;
a first field array mounted adjacent to said first winding on the other of said first shaft and said second shaft, wherein relative rotation of said first winding and said first field array induces an electrical current in said first winding to power said first de-icing element, thereby de-icing the one of said first rotor blade set and said second rotor blade set;
a second de-icing element connected to the other of said first rotor blade set and said second rotor blade set;
a second winding mounted on the other of said first shaft and said second shaft, and electrically connected to provide an electrical current across said second de-icing element; and
a second field array mounted on the one of said first shaft and said second shaft adjacent to said second winding, wherein relative rotation of said second winding and said second field array induces an electrical current in said second winding to power said second de-icing element, thereby de-icing said second rotor blade set.

12. The system of claim 11, further comprising: a first power control unit electrically connected between said first winding and said first de-icing element to modify said electrical current.

13. The system of claim 11, further comprising: a first power control unit electrically connected between said first winding and said first de-icing element to modify said electrical current; and a second power control unit electrically connected between said second winding and said second de-icing element to modify said electrical current.

14. The system of claim 13, wherein said first field array includes first and second flat circular Halbach arrays with mutually-opposing working surfaces facing said first winding, N poles on the working surface of the first circular Halbach array being aligned with S poles on the working surface of the second circular Halbach array to form shielded magnetic dipoles between the working surfaces of said field array through the coils of said first winding, said second field array includes third and fourth flat circular Halbach arrays with mutually-opposing working surfaces facing said second winding, N poles on the working surface of the third circular Halbach array being aligned with S poles on the working surface of the fourth circular Halbach array to form shielded magnetic dipoles between the working surfaces of said field array through the coils of said second winding, and said first field array, said first winding, said second field array, and said second winding are disposed in an oil-free volume and are air-cooled.

* * * * *